United States Patent [19]
Kvaternik

[11] 3,812,311
[45] May 21, 1974

[54] MINIATURE TYPE SWITCH PROBE FOR TESTING INTEGRATED CIRCUIT ASSEMBLIES OR THE LIKE

[75] Inventor: Joseph Kvaternik, Belmont, Calif.

[73] Assignee: Electronic Memories & Magnetics, Inc., Los Angeles, Calif.

[22] Filed: Dec. 11, 1972

[21] Appl. No.: 313,646

[52] U.S. Cl............ 200/61.42, 324/72.5, 324/149, 324/158 P, 339/108 TP
[51] Int. Cl.................... H01h 3/00, G01r 31/22
[58] Field of Search ........ 200/61.42, 166 R, 166 B; 339/200, 201, 202, 108 TP; 324/72.5, 149, 158 P, 158 R

[56] References Cited
UNITED STATES PATENTS

| | | | |
|---|---|---|---|
| 2,548,478 | 4/1951 | Kavanagh | 200/61.42 X |
| 3,648,169 | 3/1972 | Wiesler | 324/158 P X |
| 3,599,093 | 8/1971 | Oates | 339/108 TP X |
| 2,819,361 | 1/1958 | Grace | 200/61.42 |
| 2,334,271 | 11/1943 | Malm et al. | 200/61.42 |
| 2,385,271 | 9/1945 | Hilton | 200/61.42 X |

OTHER PUBLICATIONS

Wells, Mechanism for an X-Y Table, IBM Tech. Dis. Bulletin, Vol. 10; No. 5; Oct. 1967; pp. 632-633.

*Primary Examiner*—James R. Scott
*Attorney, Agent, or Firm*—Smyth, Roston & Pavitt

[57] ABSTRACT

Apparatus for contacting the miniature terminal pads of an integrated circuit, including a frame having a pair of thin glass sheets held a small distance apart by a thin spacer that extends along most of the periphery of the sheets, and a blade of thin conductive sheet material located between the sheets. The blade has a rear end with a recess that receives a bump formed on the spacer for pivotally mounting the blade on the spacer, and the blade also has a thin spring arm that bears against the spacer to urge the blade into firm pivotal engagement with the spacer bump and to bias the blade towards one direction of pivoting.

18 Claims, 5 Drawing Figures

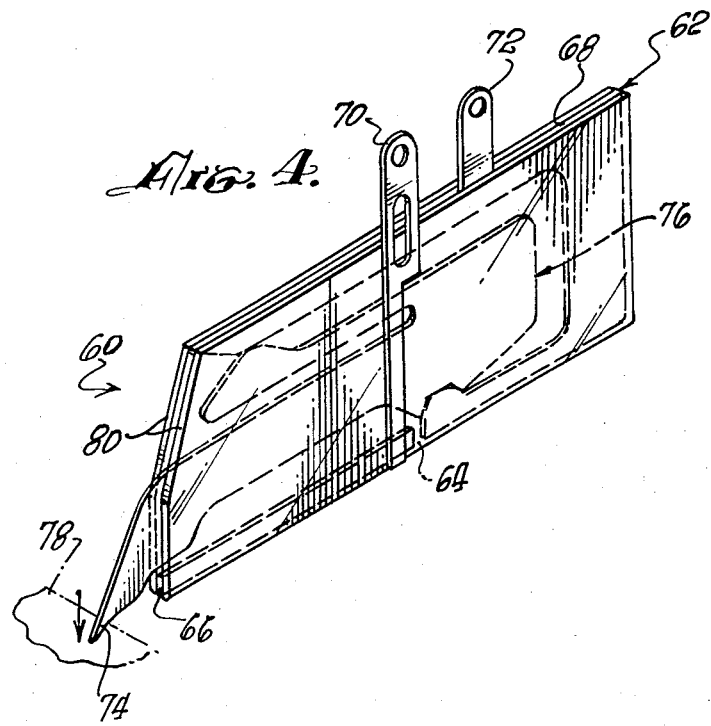
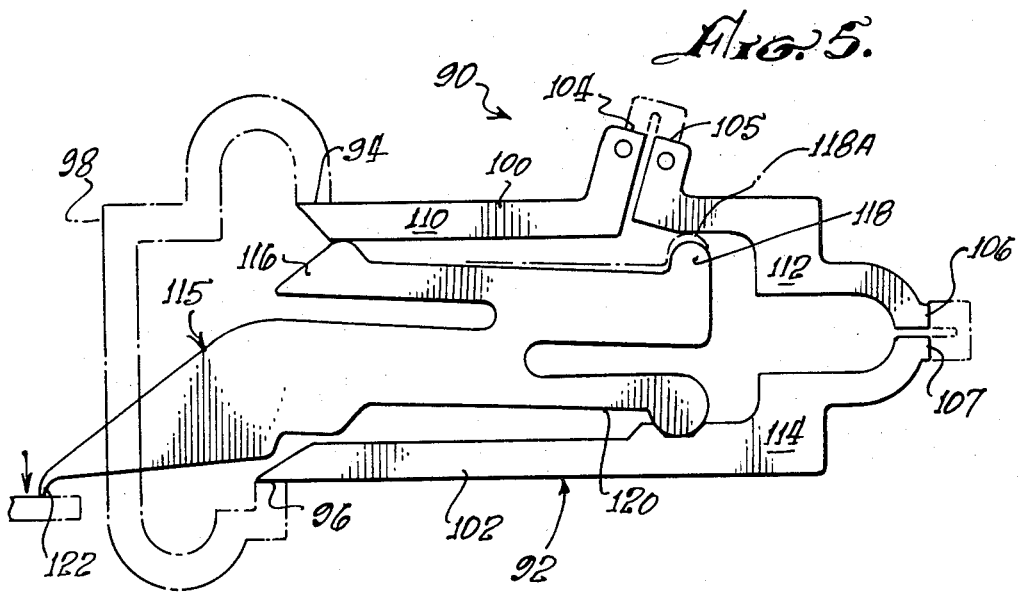

MINIATURE TYPE SWITCH PROBE FOR TESTING INTEGRATED CIRCUIT ASSEMBLIES OR THE LIKE

BACKGROUND OF THE INVENTION

This invention relates to miniature electrical contactor apparatus.

Large scale integrated circuits are often formed with numerous terminals spaced around their periphery, each terminal being extremely small and positioned close to an adjacent terminal. The circuits can be tested by using multiple probes or contactors that press against the terminals to carry electrical signals to or from testing equipment. The contactors must be very thin at their contacting ends so that they do not touch one another when simultaneously contacting the different terminals. In addition, it is necessary for the contactors to press firmly against the terminals so as to establish a good electrical connection therewith, and yet with a light pressure so as to avoid damage to either the terminal or the contactor.

SUMMARY OF THE INVENTION

In accordance with one embodiment of the present invention, a contactor assembly is provided which can fit between other closely spaced contactors to engage electrical terminals, and which reliably presses with a small but accurately controlled force against a terminal. The contactor includes a thin frame formed by a pair of thin sheets held a small distance apart by a spacer, and a blade disposed between the sheets but with an outer end extending past the sheets for contacting a terminal. The blade has an inner end with a recess that receives a bearing projection or bump formed on the spacer for pivotal mounting thereon. The blade also has a thin integral spring arm biased against the spacer for pressing the blade firmly against the bump and urging the blade to pivot in a predetermined direction. When the outer end of the blade moves down against a miniature terminal, the blade pivots smoothly on the bump in opposition to the biasing of the spring arm. The spacer is constructed of electrically conductive material, and electrical signals are passed through the spacer and through the points where it firmly contacts the blade for passage through the terminal.

The novel features of the invention are set forth with particularity in the appended claims. The invention will best be understood from the following description when read in conjunction with the accompanying drawings.

BRIEF DESCRIPTION OF THE DRAWINGS

FIG. 4 is a perspective view of a contactor assembly constructed in accordance with another embodiment of the invention; and FIG. 5 is a side elevation view of a spacer and blade constructed in accordance with still another embodiment of the invention.

DESCRIPTION OF THE PREFERRED EMBODIMENTS

Figure 1:
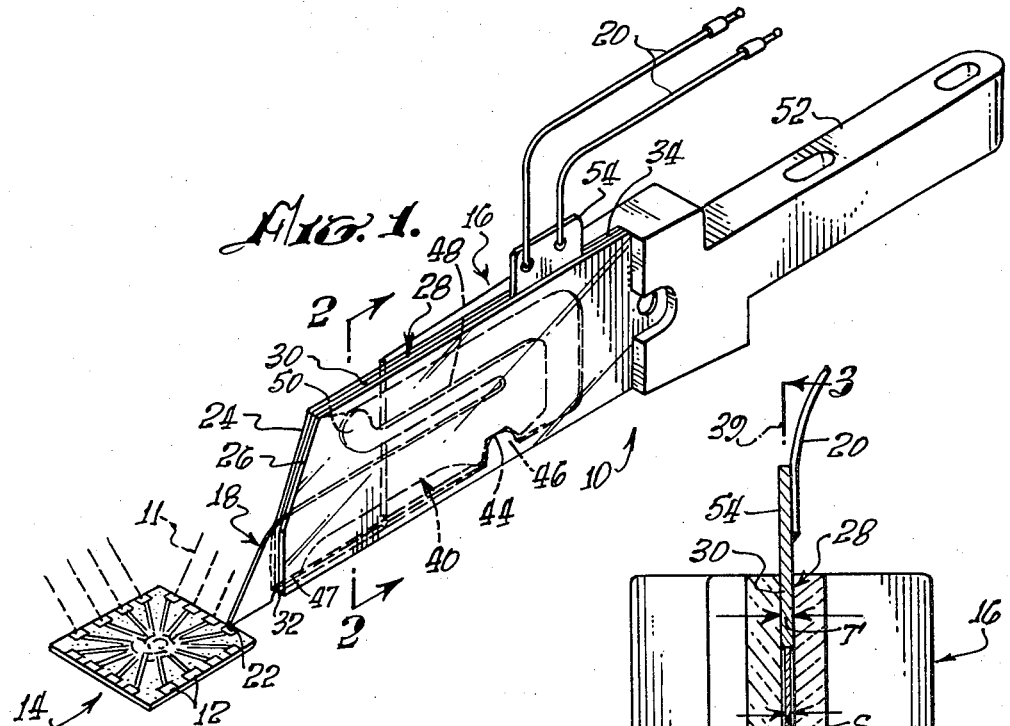
FIG. 1 is a perspective view of a contactor assembly constructed in accordance with the invention, showing how it is used to contact integrated circuit terminals.
Figure 2:
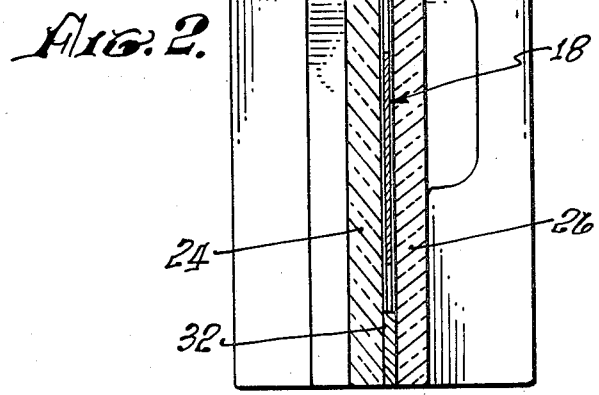
FIG. 2 is a view taken on the line 2—2 of FIG. 1.
Figure 3:
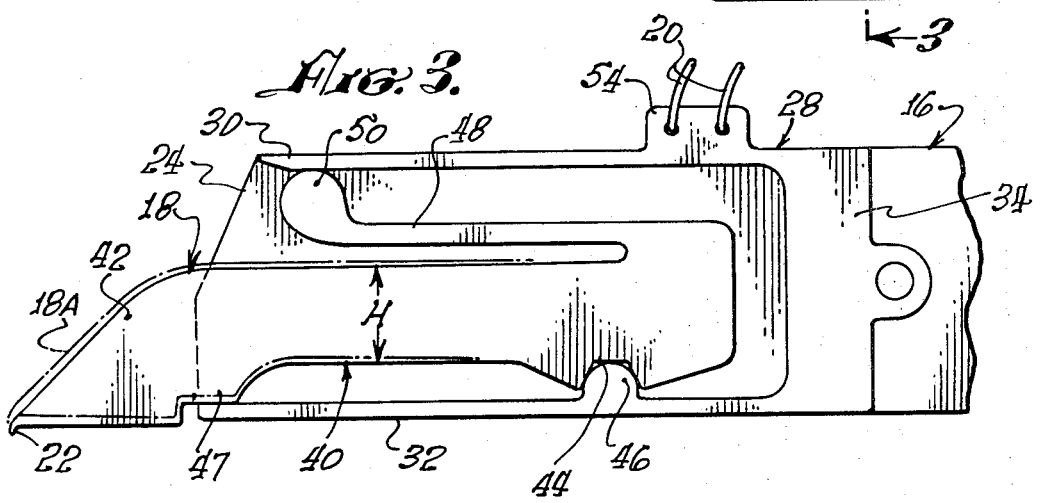
FIG. 3 is a view taken on the line 3—3 of FIG. 2.

FIGS. 1-3 illustrate a contactor assembly 10 which is designed for use in conjunction with other similar contactors 11 to contact the terminal pads or terminals 12 of a large scale integrated circuit 14. The circuit 14 may be extremely small and may contain a large number of microscopic terminal pads 12, so that great care must be taken in designing the contactors which must simultaneously engage the numerous terminal pads. The contactor assembly 10 includes a frame 16 which holds a blade 18 that actually makes contact with a terminal pad. Electrical signals pass through wires 20 and through the frame 16 and blade 18, and pass through a tip 22 of the blade to a terminal pad 12.

The frame 16 includes a pair of bearing sheets 24, 26 with smooth inner walls facing the blade 18. The sheets 24, 26 are of a thin rigid material such as glass, and are spaced apart by a spacer 28 formed from a thin sheet of electrically conductive material. The spacer 28 has upper and lower legs 30, 32 and a rear portion 34, that extend along the periphery of three sides of the bearing sheets and which are adhesively fastened to the sheets. The frame therefore forms a narrow chamber, and most of the blade 18 is located in that chamber and can move in the plane 39 of the thin spacer.

The blade 18 has a contacting arm 40 which includes a forward or outer portion 42 that extends in front of the frame and a rear portion that has a bearing recess 44 formed therein. The spacer 28 has a hemispherical projection or bump 46 which partially projects into the recess 44 of the blade to pivotally mount it on the frame. The blade has a spring arm 48 that is integral with the contacting arm 40 and which extends forwardly from a rear portion of the contacting arm. The spring arm 48 has an outer end 50 that presses upwardly against the upper spacer leg 30. The spring arm 48 therefore biases the contacting arm 40 of the blade downwardly so that the bearing recess 44 is firmly engaged with the bump 46 for pivotal mounting thereon. The spring arm also urges the contacting arm 40 to pivot in a counterclockwise direction as viewed in FIG. 3, so that the outer end of the contacting arm presses down at 47 against the lower leg 32 of the spacer.

The blade-supporting frame 16 is fixed to a mount 52 that can be moved downwardly so that the tip 22 of the blade moves against a terminal pad of the integrated circuit. As the tip 22 presses against the terminal pad, it is deflected upwardly with respect to the frame 16 so that the blade pivots to the position 18A illustrated in FIG. 3. The contacting arm 40 of the blade smoothly pivots on the spacer bump 46, so that the contacting pressure on the terminal pad is determined by biasing of the spring arm 48 rather than by friction. The force of the blade tip 22 on the terminal pad is determined by the spring loading provided by the spring arm 48. Even though the blade 18 may be very thin, it can apply considerable force to the terminal pad without buckling because the rigid bearing plates 24, 26 support the blade against such buckling. Also, the contacting arm 40 of the blade has a considerable height H, so that it can apply a considerable force at its tip so long as the bearing sheets 24, 26 prevent excessive buckling. The spring arm 48 has a much smaller height along a large portion of its length, so that it is relatively flexible and therefore can apply a moderate biasing force, and a biasing force that does not change greatly as the contacting arm 40 pivots up.

The spacer 28 is constructed of an electrically conductive sheet material having a thickness T, which is only slightly greater than the thickness S of the blade 18. Thus, in one contactor assembly that was constructed, the spacer 28 had a thickness T of 0.003 inches while the blade 18 had a thickness of 0.002 inches. Therefore, the blade 18 can freely pivot between the bearing sheets 24, 26 and yet is supported against excessive buckling, so that it can transmit a considerable force to the terminal pad. The bearing plates 24, 26 are also fairly thin, having a thickness of approximately 0.01 inch in the above-described contactor wherein the sheets have a height of approximately 0.36 inch. The thin bearing sheets permit many contactor assemblies to be mounted close together, and the tips of the blade can be even more closely spaced where the assemblies radiate in different directions from the integrated circuit.

The wires 20 which carry test signals are attached to a tab 54 formed in the spacer 28. Two wires are provided so that one can carry a large current and the other can carry substantially no current to permit a more accurate voltage measurement. Signals pass through the spacer 28 to the blade 18, through the location where the end 50 of the spring arm presses against the spacer leg 30, and through the points where the bearing bump 46 contacts the walls of the blade recess 44. The blade presses with substantial force at these locations, so that good electrical contact is made. Furthermore, there is some wiping action when the blade pivots on the bump 46, which can aid in establishing good electrical contact.

FIG. 4 illustrates another contactor assembly 60 which serves as a switch that indicates when a high contact force has been established. The assembly is largely similar to that of FIG. 1 except that the spacer 62 is formed with a gap at 64. The gap 64 divides the spacer into two sections 66, 68 each having a separate contact tab 70, 72. When the tip 74 of the blade 76 presses hard enough against a terminal 78 so that it is deflected up and loses contact with the lower spacer portion 66, as illustrated in FIG. 4, the spacer portions 66, 68 are electrically insulated. When the blade is no longer deflected, the blade tip 74 contacts the spacer portion 66. When the contact assembly is initially moved against a terminal 78, a small current is passed serially between the two tabs 70, 72. By noting whether the current is interrupted, a technician can determine whether a high pressure has been established between the tip 74 of the blade and the terminal 78. It may be noted that during manufacture of the contact assembly, the tab 70 initially extends downwardly but is bent around one of the glass sheets 80 and is adhesively held in a bent position.

FIG. 5 illustrates another contactor assembly 90 which serves as a switch. The assembly 90 includes a spacer 92 which has the illustrated shape prior to installation in the rest of the frame. After the spacer 92 is adhesively connected to a pair of bearing sheets on either side thereof, portions of the spacer are removed. This is accomplished by etching or otherwise severing the spacer at the locations 94, 96 to remove a locating portion 98 that keeps the legs 100, 102 of the spacer at a predetermined spacing. In addition, the spacer is severed at the locations 104, 105, 106 and 107 to divide the spacer into three portions 110, 112 and 114 that are electrically insulated from one another. The blade 115 has three arms 116, 118 and 120 which normally contact the three different spacer portions 110, 112, 114, respectively. When the tip 122 of the blade is pressed up, as illustrated in FIG. 5, the arm 118 loses contact with the spacer portion 112. When the tip 122 is released, the arm has the position indicated in phantom lines at 118A wherein it contacts the spacer portion 112.

Thus, the invention provides relatively simple contactor assemblies that can be mounted close to one another for contacting closely spaced terminals. The frame of each contactor includes a pair of rigid bearing sheets that are spaced a small distance apart by a thin spacer and which support a thin blade against buckling. The blade is pivotally mounted on the spacer and has an integral spring arm that provides an initial spring loading to the blade while permitting it to pivot when pressing against a terminal pad.

Although particular embodiments of the invention have been described and illustrated herein, it is recognized that modifications and variations may readily occur to those skilled in the art and consequently it is intended that the claims be interpreted to cover such modifications and equivalents. What is claimed is:

1. A miniature electrical probe assembly for contacting a semi-conductor circuit, comprising:
   a frame having a pair of thin bearing sheets of rigid material, the sheets being spaced from each other, the frame having spacer means disposed in the space between the spaced sheets and having at least a pair of opposite peripheries and having a hollow interior between such opposite peripheries and having an open end adjacent such opposite peripheries in the space between said sheets; and
   a contactor blade of electrically conductive sheet material slightly thinner than said spacer means and disposed in the hollow interior between the opposite peripheries of the spacer means and having a contacting arm pivotable substantially in the plane of said spacer about a fulcrum at a position removed from the open end of the spacer means, said contacting arm having an inner portion located between said bearing sheets and engaging one of the opposite peripheries of the frame at the end opposite the open end and having an outer end extending beyond the open end of said bearing sheets and having a tip at the outer end for contacting the semi-conductor circuit.

2. The probe assembly specified in claim 1 wherein:

said blade has a spring arm integral with said contacting arm and disposed in pressing relationship with the other one of the opposite peripheries of the spacer means, and said contacting arm has a bearing portion formed therein which is pivotally mounted on said one of the opposite peripheries of said spacer means, said spring arm pressing against said other one of the opposite peripheries of the spacer means at a different position from the open end of the frame than the bearing portion to urge pivoting of the contacting arm in a predetermined direction about the bearing portion as a fulcrum.

3. The probe assembly specified in claim 2 wherein:

said contacting arm is normally preloaded against said the first one of the opposite peripheries of the spacer means but is deflectable away from said first one of the opposite peripheries of said spacer means, and said spring arm is preloaded against said other one of the opposite peripheries of said spacer means.

4. The probe assembly specified in claim 3 wherein the opposite peripheries of the spacer means are electrically insulated from each other to provide a sensing of the deflection of the contactor arm.

5. A miniature probe assembly as set forth in claim 4 wherein the contactor arm is provided with a tip at its forward end to facilitate contact between the connector arm and the semi-conductor circuit.

6. A miniature probe assembly as set forth in claim 5 wherein the spacer frame portions are integral with each other.

7. A miniature probe assembly as set forth in claim 5 wherein the spacer frame portions are separate from each other and are electrically insulated from each other and wherein the spacer frame portions become electrically conductive relative to each other upon a pressing contact between the contactor arm and the adjacent frame portion and between the spring arm and the adjacent frame portion and wherein the first electrical conductor is connected to one of the frame portions and the second electrical conductor is connected to the other frame portion.

8. A miniature probe assembly for contacting a semi-conductor circuit comprising:
    a blade formed of a thin and resilient and electrically conductive material, said blade having a first arm with an edge forming a bearing portion and a second arm integral at one end with the first arm and having an elongated narrow flexing portion; and
    a frame including spacer means having a pair of oppositely disposed bearing walls at opposite edges of the blade and having an additional portion extending around a portion of the blade between the oppositely disposed bearing walls at the end where the first and second arms of the blade are integral, said spacer means having a bearing portion on a first one of said oppositely disposed bearing walls, said bearing portion being engaged with said blade bearing portion to pivotally support said first arm of said blade, and said second arm being biased against said other one of said oppositely disposed bearing walls of said spacer means at a position further removed from the additional portion of the spacer means than the bearing portion to urge the blade to rotate in a predetermined direction and to bias the bearing portion of the blade against the first one of the oppositely disposed bearing walls of the spacer means,
    said frame including means for engaging the spacer means and the blade in their engaged relationship.

9. The probe assembly specified in claim 8 wherein:

said blade is provided with a tip having a configuration for contacting the semi-conductor assembly and wherein
at least one electrical wire is electrically coupled to said spacer means to carry current therethrough to the blade upon an engagement between the first and second arms of the blade and the oppositely disposed bearing walls of the spacer means.

10. The probe assembly specified in claim 8 wherein:

said bearing portion of said spacer means includes a bump, and said bearing portion of said blade includes a recess receiving and engaging said bump.

11. The probe assembly specified in claim 8 wherein:

said spacer means is formed of a sheet of a uniform thickness slightly greater than the thickness of the blade and said retaining means in said frame include a pair of sheets each disposed against an individual one of the faces of the spacer means and further includes a mount for pressing the sheets against the faces of the spacer means.

12. The probe assembly specified in claim 8 wherein:

said first arm has an outer end extending beyond said bearing walls and the tip is disposed at the outer end and said first arm has an inner portion which is opposite said outer end and said bearing portion of said first arm is disposed in said inner portion and said first arm has a middle portion between said ends which presses against said spacer means when the outer end is undeflected by contact against the semi-conductor circuit.

13. A probe assembly as set forth in claim 12 wherein the oppositely disposed bearing walls of the spacer means are integral with each other.

14. A probe assembly as set forth in claim 12 wherein the oppositely disposed bearing walls of the spacer means are separate from each other and are electrically insulated from each other and wherein the oppositely disposed bearing walls become electrically conductive relative to each other upon a pressing contact between the first arm and the first one of the bearing walls and between the second arm and the other one of the bearing walls wherein first and second electrical leads are respectively connected to the first one and the other one of the bearing walls.

15. A miniature probe assembly for contacting a semi-conductor circuit, comprising:
    spacer means formed of thin electrically conductive sheet material defining opposite faces, the spacer means having a rear end portion and a pair of elongated legs disposed in spaced relationship and extending in a forward direction from the rear end portion and defining an opening at the forward end;
    a pair of bearing sheets disposed against the opposite faces of the spacer means along the rear end and the two legs to define with the spacer means a thin but wide and long chamber that is open at the forward end; and
    a blade of thin electrically conductive material disposed in said chamber and pivotable therein and having a forward portion extending through the forward open end of said chamber and having first and second arms integral at the rear end, the first arm cooperating with a first one of the legs to define a fulcrum at a position near the rear end for pivoting of the blade in the chamber and the second arm being constructed to press against the other one of the legs at a position near the forward end of the chamber to pivot the blade on the fulcrum.

16. The probe assembly specified in claim 15 wherein:

said second arm constitutes a spring for pressing the first arm against the first leg at the first position in accordance with forces against the second arm by the second leg and wherein the first arm has at the forward end a portion which engages the first leg in at least one pivotable position of the blade.

17. A miniature probe assembly for contacting a semi-conductor circuit, comprising:

a blade of a thin and electrically conductive and resilient material including a contactor arm and a spring arm integral with the contactor arm at a rear position on the contactor and spring arms, said spring arm being resiliently moveable with respect to the contactor arm;

a frame including means for supporting the blade to permit deflection of the contactor arm and further including first and second electrically conductive spacer portions insulated from each other and supported by the supporting means and at least at particular times respectively in pressure contact with said contactor arm and said spring arm at different positions along the lengths of the arms and disposed adjacent respectively to said contactor arm and said spring arm and disposed externally of said contactor arm and said spring arm to normally squeeze said contactor arm and said spring arm together between said first and second frame portions but said contactor arm being deflectable away from the adjacent frame portion when pressed against the semi-conductor circuit; and first and second electrical conductors respectively connected to at least one of said first and second frame portions, whereby to permit sensing of contactor arm deflection by sensing interruption of a current passing serially between the first and second electrical conductors.

18. A miniature probe assembly as specified in claim 17 wherein the contactor arm is pivotable in a first direction relative to the adjacent spacer portion in accordance with pressure contact between the blade and the semi-conductor circuit and wherein the contactor arm is pivotable in an opposite direction in accordance with pressure contact between the spring arm and adjacent spacer portion.

* * * * *